US010341381B2

(12) United States Patent
Lewis et al.

(10) Patent No.: US 10,341,381 B2
(45) Date of Patent: Jul. 2, 2019

(54) INHIBITING ELECTROMAGNETIC FIELD-BASED EAVESDROPPING

(71) Applicant: ENTIT Software LLC, Sunnyvale, CA (US)

(72) Inventors: John M. Lewis, Sunnyvale, CA (US); Susan K. Langford, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/562,563

(22) PCT Filed: Apr. 29, 2015

(86) PCT No.: PCT/US2015/028254
§ 371 (c)(1),
(2) Date: Sep. 28, 2017

(87) PCT Pub. No.: WO2016/175792
PCT Pub. Date: Nov. 3, 2016

(65) Prior Publication Data
US 2018/0115583 A1  Apr. 26, 2018

(51) Int. Cl.
H04L 29/06 (2006.01)
H04L 29/08 (2006.01)
G09C 1/00 (2006.01)
H04L 9/00 (2006.01)

(52) U.S. Cl.
CPC ............ *H04L 63/1475* (2013.01); *G09C 1/00* (2013.01); *H04L 9/002* (2013.01); *H04L 67/1097* (2013.01); *H04L 2209/08* (2013.01); *H04L 2209/16* (2013.01)

(58) Field of Classification Search
CPC . H04L 63/1475; H04L 9/002; H04L 67/1097; H04L 2209/08; H04L 2209/16; G09C 1/00

See application file for complete search history.

(56) References Cited

U.S. PATENT DOCUMENTS

| 8,074,079 B2 | 12/2011 | Chang |
| 8,429,417 B2 | 4/2013 | Salgado et al. |
| 8,520,855 B1* | 8/2013 | Kohno ............... G06F 21/602 380/259 |
| 8,526,621 B2 | 9/2013 | Rabin et al. |
| 8,726,040 B2 | 5/2014 | Dolgunov et al. |

(Continued)

FOREIGN PATENT DOCUMENTS

WO   WO-2010020834 A1   2/2010

OTHER PUBLICATIONS

Shin, S. et al., "Security Analysis of Password-authenticated Key Retrieval," (Research Paper), Oct. 9, 2013, 5 pages.

(Continued)

*Primary Examiner* — Morshed Mehedi

(57) ABSTRACT

A technique includes performing a plurality of instances of retrieving components of a security key from a plurality of locations of an electronic device and constructing the security key from the components. The technique includes inhibiting electromagnetic field-based eavesdropping from being used to reveal the security key, where the inhibiting includes varying a protocol that is used to retrieve the components among the instances.

15 Claims, 8 Drawing Sheets

(56) References Cited

U.S. PATENT DOCUMENTS

| | | | |
|---|---|---|---|
| 8,787,566 B2 | 7/2014 | Relyea | |
| 8,913,383 B1 * | 12/2014 | Goldsmith | H05K 7/20236 |
| | | | 257/714 |
| 9,306,739 B1 * | 4/2016 | Troupe | H04L 9/0852 |
| 2005/0195975 A1 * | 9/2005 | Kawakita | H04L 9/0822 |
| | | | 380/30 |
| 2006/0224616 A1 * | 10/2006 | Imoto | G06F 17/30743 |
| 2006/0269063 A1 * | 11/2006 | Hauge | G06F 21/10 |
| | | | 380/262 |
| 2009/0228719 A1 * | 9/2009 | Almgren | H04L 63/0428 |
| | | | 713/193 |
| 2011/0170690 A1 | 7/2011 | Shpantzer | |
| 2013/0305369 A1 * | 11/2013 | Karta | H04L 63/1416 |
| | | | 726/23 |
| 2014/0037093 A1 | 2/2014 | Park et al. | |
| 2014/0219443 A1 * | 8/2014 | Brainis | H04L 9/0852 |
| | | | 380/46 |
| 2014/0310527 A1 * | 10/2014 | Veugen | H04L 9/3013 |
| | | | 713/171 |
| 2014/0380036 A1 * | 12/2014 | Neumann | H04L 63/062 |
| | | | 713/150 |

OTHER PUBLICATIONS

International Searching Authority., International Search Report and Written Opinion dated Jan. 27, 2016 for PCT Application No. PCT/US2015/028254 Filed Apr. 29, 2015, 14 pgs.

* cited by examiner

INHIBITING ELECTROMAGNETIC FIELD-BASED EAVESDROPPING

BACKGROUND

A given computer system (a data center, for example) that processes and/or stores sensitive data typically employs measures to protect the data from unauthorized access. For example, the computer system may process and/or store such sensitive information, as credit cardholder data, patient records, personnel information, intellectual property, and so forth.

The protective measures may guard against unauthorized access while the sensitive data is in motion (while the data is being communicated across communication channels, for example). For example, the computer system may encrypt data that is communicated across communication channels. The protective measures may further guard against access to cryptographic keys that are stored by the computer system and used by the system to encrypt/decrypt the sensitive data.

DETAILED DESCRIPTION

Figure 1A:
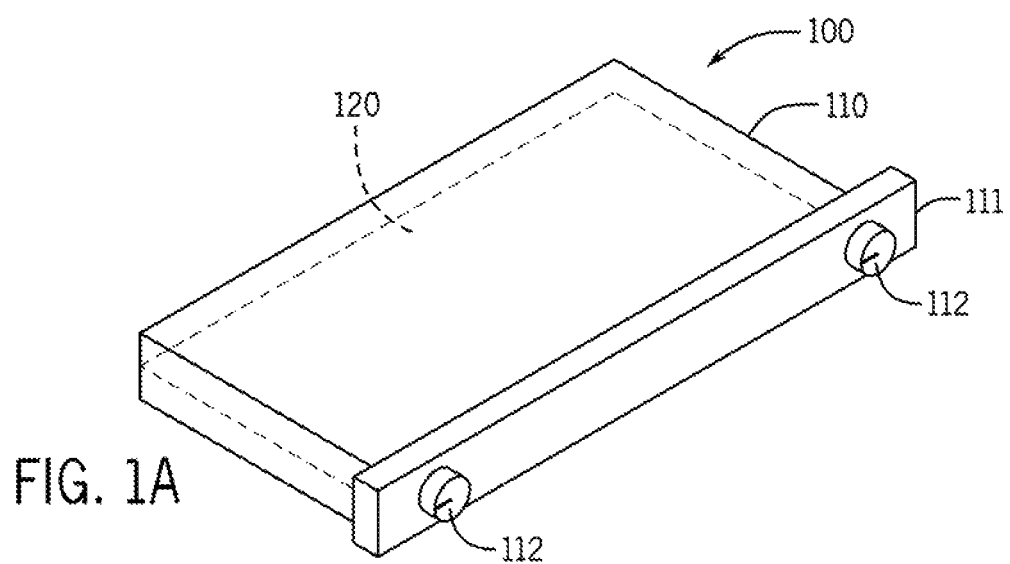
FIG. 1A is a perspective view of a secure key manager according to an example implementation.

An electronic system that processes and/or stores sensitive data (data representing patient records, personnel records, credit cardholder information, banking information, intellectual property, and so forth) may store one or multiple cryptographic keys, called "security keys," herein, which are used by the electronic device to encrypt and decrypt the sensitive data while in transit. In this manner, the electronic system may communicate encrypted, sensitive data for internal communications within the electronic device (communications between the system's processing cores and memories, for example), as well as communicate encrypted, sensitive data in external communications between the system and other electronic systems. Because access to the security keys allows access to the underlying sensitive data, the electronic system may employ a number of security measures to prevent, or at least inhibit, unauthorized access to the stored security key(s).

For example, the electronic system may employ measures to prevent a physical security attack. In this manner, sensitive components of the electronic system, which store sensitive information, such as security key(s) and data encrypted by such key(s), may be enclosed within a locked, metal container. The electronic system may also contain measures to prevent a physical attack called a "penetration attack," in which a tool is used to penetrate the metal container for purposes of gaining access to the sensitive information. The penetration attack may involve the use of a probe that is inserted into an opening (an opening drilled in or punched through the metal container, for example), for purposes of contacting the electronic device's circuitry to extract the sensitive information.

As another example, instead of using a probe, a particular type of penetration attack, called a "punch through attack" herein, may employ the use of a tool to punch into an integrated circuit (IC) of the electronic system to extract a semiconductor memory for purposes of reading data stored in the extracted memory.

One way to prevent a punch through attack from obtaining a given security key is spatially distribute the storage of the key in the electronic system. In this manner, components of the key may be stored in memories that are disposed at different physical locations of the electronic system. When a security processor of the electronic system is to use the security key (for such purposes as encryption, decryption, and so forth), the security processor retrieves the components of the key and constructs the key from the retrieved components. After the processing that uses the security key is complete, the security processor may then erase the constructed key from the processor's memory, so that the key is once again stored as separate components in different locations of the electronic system.

Although the above-described distributed storage of the key may reduce the likelihood that a punch through attack gains access to the key, reconstructing the key inside the electronic device may emanate electromagnetic fields that potentially expose the key to wireless eavesdropping.

More specifically, each time the key is reconstructed inside the electronic system, the system generates electrical signals, such as bus signals, for example. In this manner, the bus signals include address, control and data signals that are communicated across one or multiple buses of the electronic system for purposes of retrieving the spatially distributed components of the key from the memories that store the components.

The signals that are generated in the process of retrieving the key components may result in unintended electromagnetic field emissions, which propagate from the electronic system. It is possible that electromagnetic field-based eavesdropping may be used to discover patterns in the emissions, and these patterns may reveal the components of the security key and the order in which these components are assembled to construct the security key. In other words, electromagnetic field eavesdropping may be used to gain access to a security key that is stored in a spatially distributed fashion in the electronic system by observing the electromagnetic field emissions from operations related to retrieving these components.

In accordance with example implementations that are described herein, an electronic system stores components of a security key in memory locations at different locations of the system; and for purposes of inhibiting electromagnetic field-based eavesdropping from being used to reveal the key, the electronic system varies the timing and/or order in which the components of the key are retrieved, each time a key is constructed. Therefore, even if electromagnetic field emissions from the system are monitored during retrieval of the key components, the variations in the timing and/or order in the component retrieval, inhibits discerning from these emissions the key components and order that the components are assembled to construct the key.

Referring to FIG. 1A, as a more specific example, an electronic system (a processor-based data center, for example) may contain one or multiple secure key managers, such as example secure key manager 100, for such purposes of managing, protecting, serving and preserving security keys for the system. The secure key manager 100 may, in accordance with example implementations, be a blade that is constructed to be received in a backplane bus slot of a computer system rack.

The secure key manager 100 stores sensitive data, such as one or multiple security keys; and, in accordance with example implementations, the security manager 100 has one or multiple security barrier layers that prevent a penetration attack from accessing the sensitive data. As depicted in FIG. 1A, the security barriers may include an outer security barrier layer that is formed from a metal enclosure 110 that surrounds, or encloses, a hardware platform, here a "circuit assembly 120" of the secure key manager 100. In general, the circuit assembly 120 contains one or multiple circuit substrates and various integrated circuits (ICs) (memory modules, processor core devices, and so forth), which have memories that store security keys and possibly other sensitive data for the secure key manager 100.

In accordance with example implementations, the metal enclosure 110 may, in general, may have no ports, or openings, through which a penetration attack may occur (through which a punch through tool or probe may be inserted, for example) for purposes of gaining access to the security key(s) and/or other sensitive data stored inside the secure key manager 100. The secure key manager 100 may communicate with external circuitry using (as examples) connector sockets, optical signaling, inductive coupling connections, and so forth. The metal enclosure 110 may include various security mechanisms, such as (as an example) key locks 112, which secure the enclosure 110 from being opened (by removal of a front panel 111 of the enclosure 110, for example) except when two keys (keys held by two authorized employees, for example) are concurrently inserted and turned. The secure key manager 100 may have other features, such as penetration detection layers, that are used by the secure key manager 100 to alert the manager 100 when physical tampering is detected, so that the manager 100 may take the appropriate corrective action (erasing security keys, alerting security personnel, and so forth).

Figure 1B:
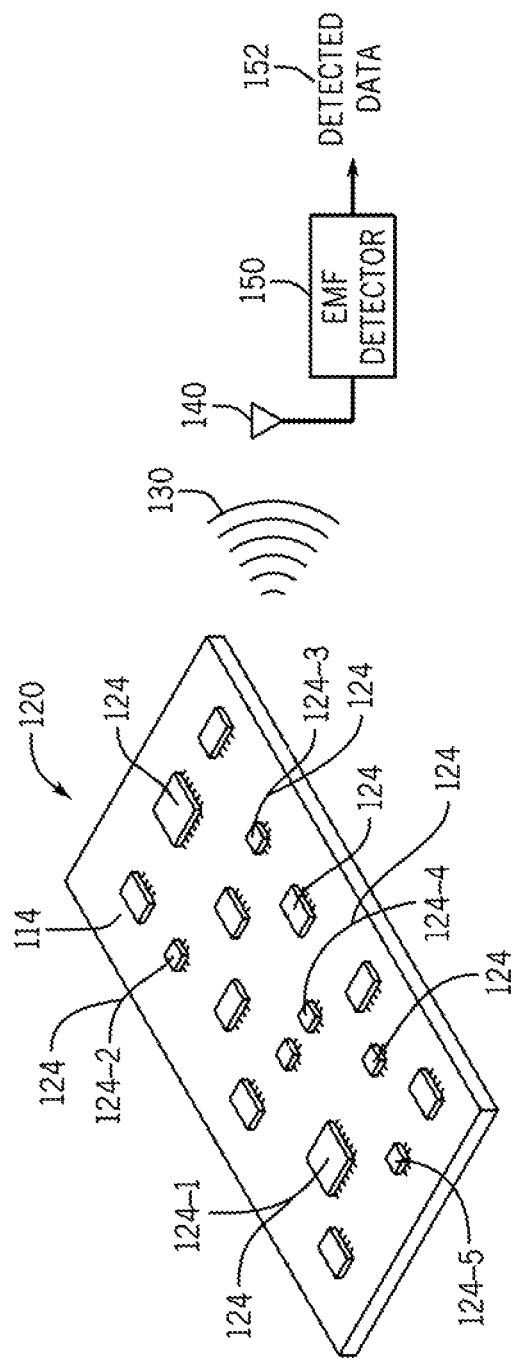
FIG. 1B is an illustration of electromagnetic field-based eavesdropping according to an example.

The secure key manager 100 has features to prevent electromagnetic field-based eavesdropping from being used to reveal one or more security keys that are stored by the manager 100. Referring to FIG. 1B in conjunction with FIG. 1A, as an example, the circuit assembly 120 may include a circuit substrate 114 (a printed circuit board (PCB) substrate, for example), which is populated with ICs 124. It is noted that the circuit assembly 120 may have one or multiple additional circuit substrates, which have additional ICs, in accordance with further example implementations.

For the example implementation of FIG. 1B, the ICs 124 may include a microprocessor core-based IC 124-1, which contains an entity called a "security processor 204" (depicted in FIG. 2 and described below) herein. As an example, the security processor 204 may be a cryptographic processor, which uses security keys for such processing applications as encrypting data, decrypting data, serving security keys to clients of the secure key manager, and so forth.

For purposes of preventing a punch through attack from gaining access to a security key that is stored by the secure key manager 100, the key is not stored in a single physical location, but rather, the key is subdivided into components, and these components are stored in memories that are disposed at different physical locations within the secure key manager 100. For example, for the example implementation of FIG. 1B, components of a given security key may be stored in memories of ICs 124-2, 124-3, 124-4, 124-5, and so forth. It is noted that in accordance with further example implementations, a given key may be subdivided into more than four or less than four components, which are stored at different physical locations.

Figure 2:
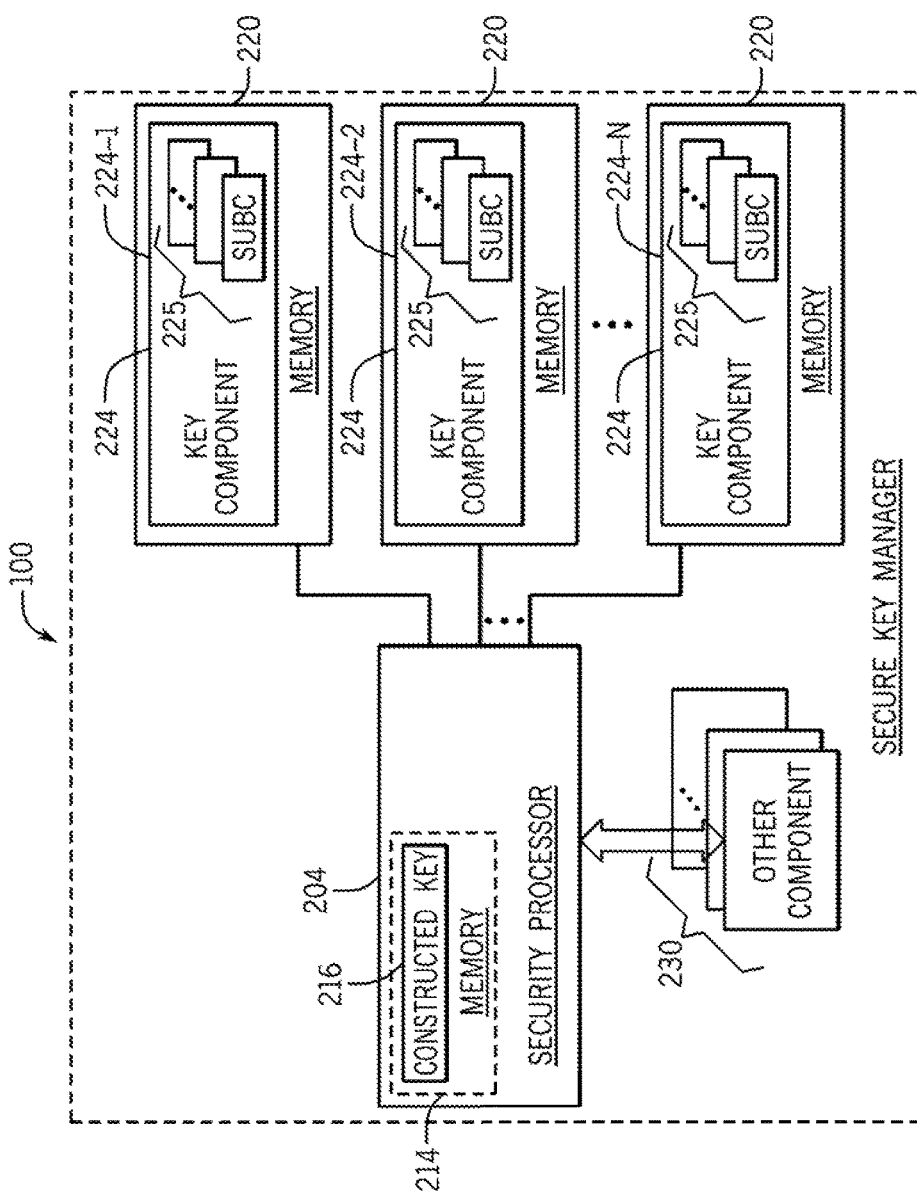
FIG. 2 is an electrical schematic diagram of the secure key manager of FIG. 1 according to an example implementation.

Referring to FIG. 2, in accordance with example implementations, the security processor 204 may temporarily use a security key for a given processing application. For example, the security processor 204 may receive a request from an external client of the secure key manager 100 to serve the security key to the client, may use the security key to encrypt data, may use the security to decrypt data, and so forth. In accordance with an example implementation, when the security processor 204 needs the security key for such a processing application, the processor 204 retrieves components 224 (N key components 224-1, 224-2 ... 224-N for a given key, being depicted as an example in FIG. 2) from spatially distributed memories 220 of the secure key manager 100 and reconstructs the key to generate a reconstructed copy 216 of the key that is temporarily stored in a memory 214.

For the example implementation of FIG. 2, the memory 214 is a memory of the processor 204. A given key component 224 may be subdivided into multiple subcomponents 225, in accordance with example implementations. After the processing application that uses the security key is complete, the security processor 204 erases the copy 216 of the constructed security key. As depicted in FIG. 2, the secure key manager 100 may have various other components 230 other than the security processor 204 and memories 220, such as one or multiple additional memories, one or multiple additional processors, input/output (I/O) interfaces, and so forth.

The granularity at which the security processor 204 retrieves the security key from the memory 214 depends on the particular implementation. For example, in accordance with some implementations, the key component 224 is the smallest unit of data retrieved by the security processor 204 at one time (in one read operation, for example) when constructing the security key. For these implementations, the security processor 204 may retrieve a given key component 224 by reading an address of the component 224 (from a table in a memory of the security processor 204 where all of the addresses of the key components 224 are stored, for example), and using the retrieved address to generate a write request that identifies the location of the key component 224.

In accordance with further example implementations, the key subcomponent 225 is the smallest unit of data that is retrieved at one time (in one read operation, for example) by the security processor 204 when constructing the security key. For these implementations, the security processor 204 may retrieve a given key subcomponent 225 by reading an address of the key subcomponent 225 (from a memory of the security processor 204 where all of the locations or addresses of the key subcomponents 225 are stored, for example) and then generating a write request that identifies the location of the component 225.

In accordance with some implementations, a memory of the security processor 204 may store data representing the addresses of the key components 224; and the key subcomponents 225 for a given key component 224 may be located at predefined address offsets from the address of the given key component 224. In further example implementations, the security processor 204 may store data representing all the addresses for the key subcomponents 225. In accordance with some implementations, the addresses for the key components 224/subcomponents 225 may be stored in a table in a memory other than a memory of the security processor 204.

The security processor 204 may, in accordance with example implementations, store data that allows the security processor 204 to, during a given process to retrieve a security key, track which key components 225 of the security key have been retrieved and which key subcomponents 224 of a given key component 225 have been retrieved.

Thus, a given write request may target an entire key component 224, or the write request may target one or multiple subcomponents 225 of a given key component 224. In response to the write request, the memory storing the targeted subcomponent(s)/component provides data corresponding to the subcomponent(s)/component, and this data is communicated back to the security processor 204.

Referring to FIG. 1B in conjunction with FIG. 2, when the security processor 204 retrieves the components of a given security key, electrical signals are produced, such as the signals involved with communicating the corresponding address, control and data over one or multiple buses of the secure key manager 100. These signals may cause unintended electromagnetic field emissions 130 to emanate from the secure key manager 100 and may subject the secure key manager 100 to electromagnetic field-based eavesdropping, often called a "Tempest" attack. In this manner, as shown in FIG. 1B, an electromagnetic field detector 150 (e.g., a radio) may be positioned to detect (via its antenna 140) a signal that represents the electromagnetic field emissions 130 for purposes of producing detected data 152 that may reveal communications inside the secure key manager 100. The data 152, may, if not for the features of the secure key manager 100 disclosed herein, reveal patterns that allow unauthorized construction of one or more security keys shared by the secure key manager 100.

Figure 3:
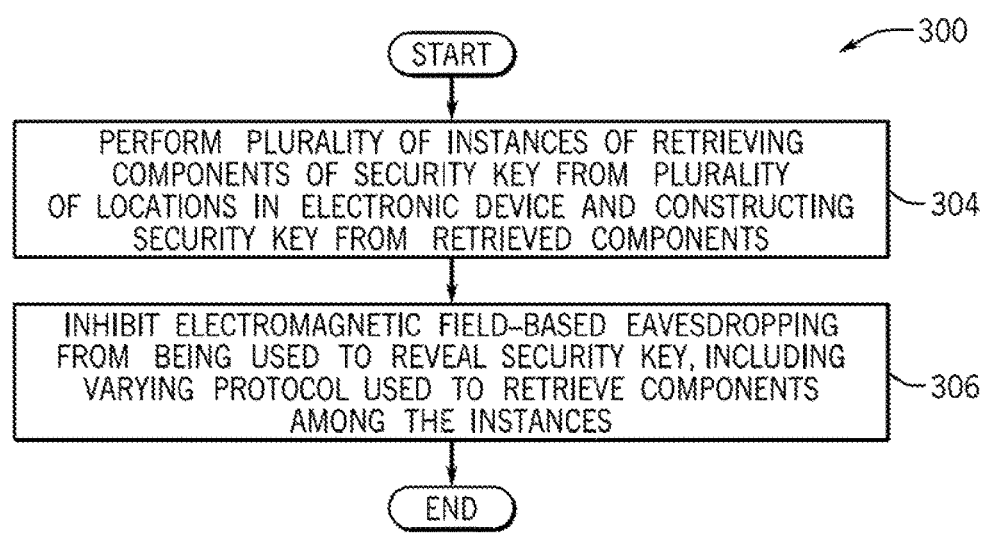
FIGS. 3, 4, 5, 6 and 7 are flow diagrams of techniques to inhibit electromagnetic field-based eavesdropping according to example implementations.

For purposes of preventing electromagnetic field-based eavesdropping from gaining access to a given security key, the security processor 204 may generally perform a technique 300 that is depicted in FIG. 3. Referring to FIG. 3 in conjunction with FIG. 2, in accordance with example implementations, the technique 300 includes performing (block 304) a plurality of instances of retrieving components of a given security key from a plurality of locations and constructing the security key from the retrieved components. The technique 300 includes inhibiting (block 304) electromagnetic field-based eavesdropping from being used to reveal the security key in a process that includes varying the protocol that is used to retrieve the components.

In this manner, in accordance with example implementations, although the security processor 204 may reconstruct a given security key a certain number of times, the processor 204 varies the timing and/or the order associated with retrieving the components of the security key each of these times so that no discernable pattern related to the key construction may be detected using electromagnetic field-based eavesdropping. In accordance with example implementations, the "order" of the component retrieval refers to the sequential order in which the components/subcomponents of the security key are retrieved, and the "timing" of the component retrieval refers to the timing at which the security processor 204 generates the corresponding write requests.

As a more specific example, in accordance with example implementations, the security processor 204 may perform a given protocol for retrieving the components for a security key. The protocol may be the same each time, except for the order in which the components of the key are retrieved. For example, the security processor 204 may, in multiple instances, retrieve the components for a given security key, vary the sequential order in which the components are retrieved and construct the key from the retrieved components.

As a more specific example, for a first instance of constructing a given security key, the security processor 204 may retrieve the first, third, fourth, second and fifth components in that order; for the second instance of constructing the key, the security processor 204 may retrieve the fifth, second, fourth, first and third components in that order; for the third instance of constructing the key, the security processor 204 may retrieve the fourth, third, fifth, first and second components in that order; and so forth.

Figure 4:
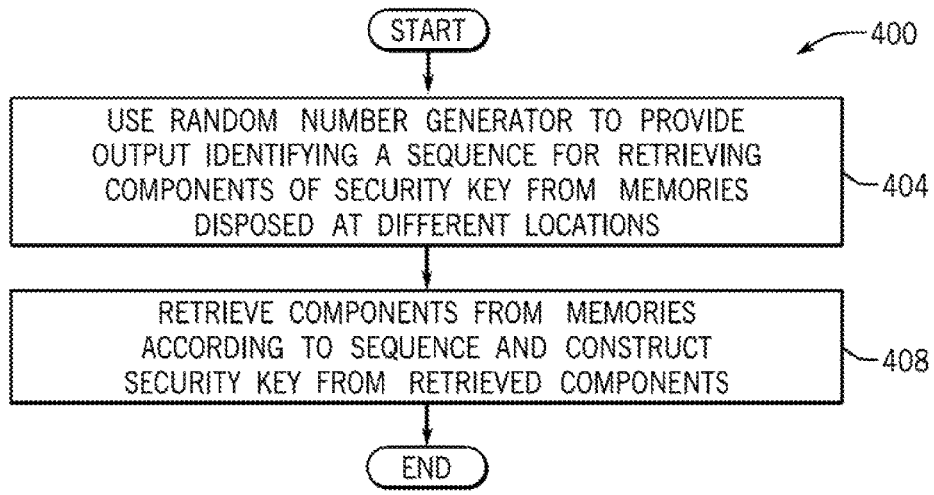

In accordance with example implementations, the security processor 204 may randomly determine the order in which the components of a given security key are retrieved. Referring to FIG. 4 in conjunction with FIG. 2, as a more specific example, the security processor 204 may perform a technique 400 that includes using (block 404) a random number generator to provide an output, which identifies a sequence for retrieving components of a security key from memories that are disposed at different locations. Pursuant to the technique 400, the security processor 204 retrieves the components from the memories according to the identified sequence and constructs the security key from the retrieved components, pursuant to block 408. Thus, due to the technique 400, the retrieval sequences are irregular (varying in time and/or order, for example) relative to each other.

In accordance with example implementations, the "random number" may be a truly random number or a pseudo random number. For example, the random number generator may be a seed-based generator that provides a near random, or pseudo random, output. As a more specific example, the random number generator may be a polynomial-based generator, which provides an output that represents a pseudo random number, and the pseudo random number is based on a seed value that serves as an input to a polynomial function. As examples, the seed value may be derived from a state or condition at the time the random number is to be generated, such as input provided by real time clock (RTC) value, a counter value, a measured noise value, a register value, and so forth. The polynomial-based generator receives the seed value as an input, applies a polynomial function to the seed value and provides an output (digital data, for example) that represents the pseudo random number.

In accordance with further example implementations, the random number generator may be a true random number generator that provides an output that represents a truly random number. For example, the random number generator may include an analog-to-digital converter (ADC) that provides a random digital output; and the ADC may sample a truly random analog signal, such as a thermal noise signal (a Johnson-Nyquist noise signal provided by a resistor, for example) or an atmospheric noise signal that is provided by an antenna.

In accordance with further example implementations, the security processor 204 may select a predetermined plan for retrieving the components of a given security key. In this manner, the selected plan may be contained in a set of plans, which are represented by data stored inside a memory of the processor 204, in accordance with example implementations. The selection of the plan may be based on a random number, may be based on a sequential selection indicated by an index, and so forth. In accordance with some implementations, a given plan identifies an order in which the components of the security key are retrieved and a timing for retrieving the keys. For example, a given plan may specify that components two, three, one, five and four of a five component key are retrieved in that order.

Continuing the example, the selected plan may also specify that a certain delay is incurred between the retrieval of components two and three and a different delay is incurred between the retrieval of components three and one. The delay may be a fixed delay, a delay as determined from an RTC value, a delay as determined from a register value, a delay in terms of intervening operations to be performed between times when the components are retrieved, and so forth. The effect is that the components for a given key are not retrieved according to a fixed timing pattern.

In accordance with example implementations, the plan may further specify an order and/or timing for retrieving the subcomponents of a given key component. In this manner, in accordance with example implementations, the security processor 204 may vary the timing and/order in which the subcomponents of a given key component are retrieved. Moreover, the security processor 204 may retrieve a first set of subcomponents for a given key component according to a certain timing/order, retrieve one or multiple subcomponents of one or multiple other key components and then at a later time, retrieve additional subcomponents of the given key component. Therefore, the security processor 204 may vary the timing/order of the component retrieval as well as vary the timing/order of the subcomponent retrieval.

Figure 5:
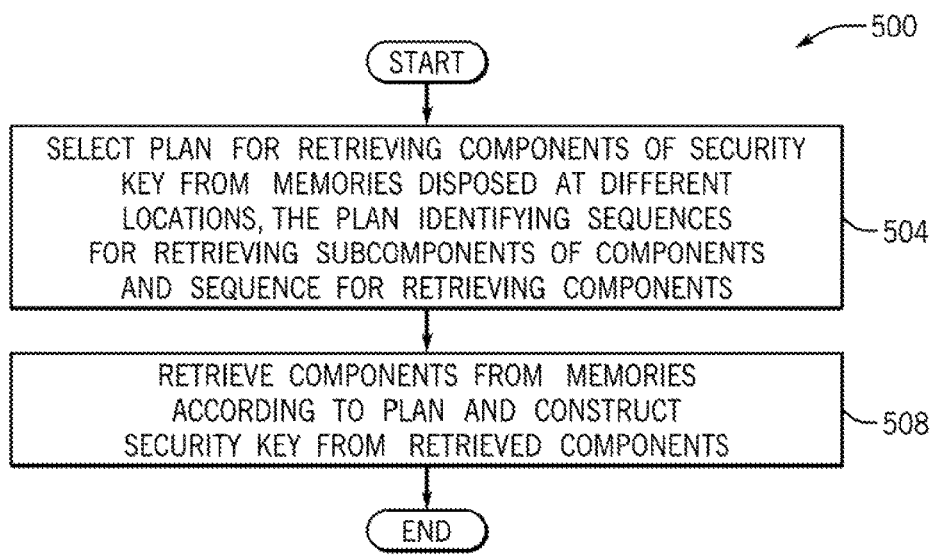

Thus, referring to FIG. 5 in conjunction with FIG. 2, in accordance with some implementations, the security processor 204 performs a technique 500 to construct a given security key. Pursuant to the technique 500, the security processor 204 selects (block 504) a predetermined plan for retrieving components of a security key from memories that are disposed at different locations. The selected plan identifies a sequence for retrieving the subcomponents of each component and a sequence for retrieving the components. The component and subcomponent retrieval sequences, in accordance with example implementations, specify the timing and order for the retrievals. The security processor 204 may then retrieve (block 508) the components from the memories according to the plan and construct the security key from the retrieved components.

Figure 6:
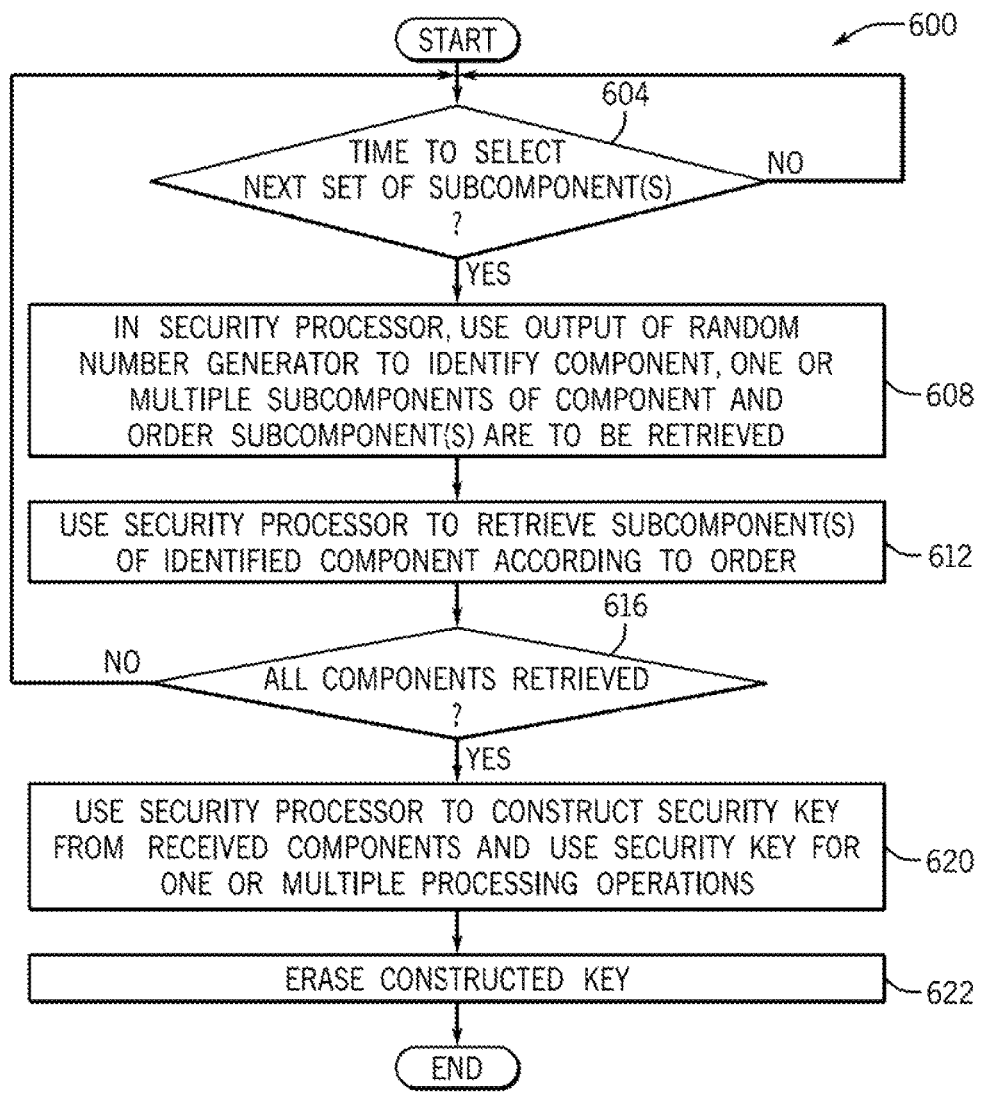

As another example, the security processor 204 may construct a given security key by retrieving the components and subcomponents of the key according to a timing that is random and an order that is random. More specifically, referring to FIG. 6 in conjunction with FIG. 2, in accordance with example implementations, the security processor 204 may perform a technique 600 when the processor 204 determines that a security key is needed for a processing operation. The technique 600 first includes determining (decision block 604) whether it is time to select the next set of subcomponents. The security processor 204 may make this determination based on a predefined time schedule, in accordance with some implementations. In this manner, the security processor 204 may delay until a counter or some otherwise time reference (a real time clock (RTC) reference, for example) represents a time value that corresponds to a time of the predefined time schedule, and when this occurs, the security processor 204 may select the next set of subcomponents. In accordance with further example implementations, the security processor 204 may interject a random delay before proceeding with retrieving the next set of subcomponents. This delay, in effect, varies a timing in which sets of subcomponents are retrieved.

In response to determining that it is time to select the next set of components, the security processor 204 uses (block 608) an output of a random number generator to identify a key component, one or multiple subcomponents of the identified key component and an order in which the subcomponent(s) are to be retrieved. The security processor 204 then retrieves (block 612) the subcomponent(s) of the identified component according to the order. In accordance with some implementations, the security processor 204 may vary (randomly or pseudo randomly, for example) a timing associated with retrieving the subcomponents in block 612.

Pursuant to decision block 616, the security processor 204 determines whether all components of the security key have been retrieved, and if not, control returns to block 608. Otherwise, all components have been retrieved, and the security processor 204 constructs the security key from the received components and uses the constructed security key for one or multiple cryptographic processing operations (or for other operations) Subsequently, the security processor 204 erases its copy of the constructed key, pursuant to block 622.

Figure 7:
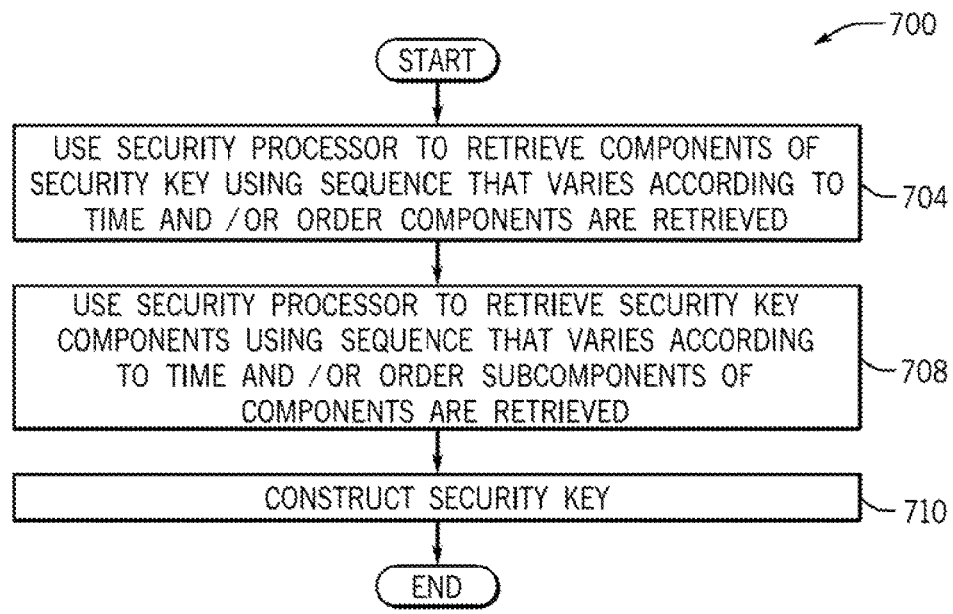

Referring to FIG. 7 in conjunction with FIG. 2, in general, in accordance with example implementations, the security processor 204 performs a technique 700, which includes retrieving (block 704) components of a security key using a sequence that varies according to the time and/or order the components are retrieved. Moreover, the security processor 204 retrieves (block 708) the security key subcomponents using a sequence that varies according to time and/or order the subcomponents are retrieved, pursuant to block 708. The security processor may then construct (block 710) the key based on the retrieved components.

Figure 8:
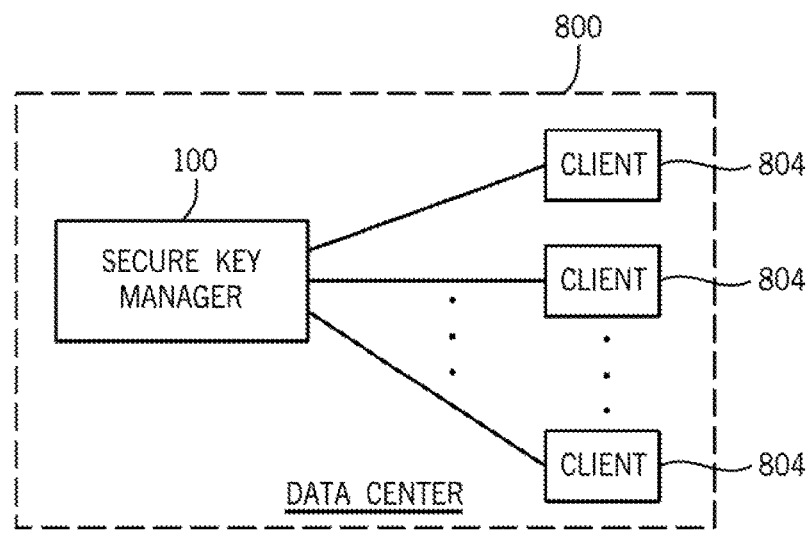
FIG. 8 is a schematic diagram illustrating a data center according to an example implementation.

Referring to FIG. 8, in accordance with example implementations, the secure key manager 100 may be part of a data center 800, in which the secure key managing server 100 manages, stores and serves keys for one or multiple clients 804 of the data center 800. As an example, the secure key manager 100 and clients 804 may be blades that are inserted into one or more racks of the data center 800.

Figure 9:
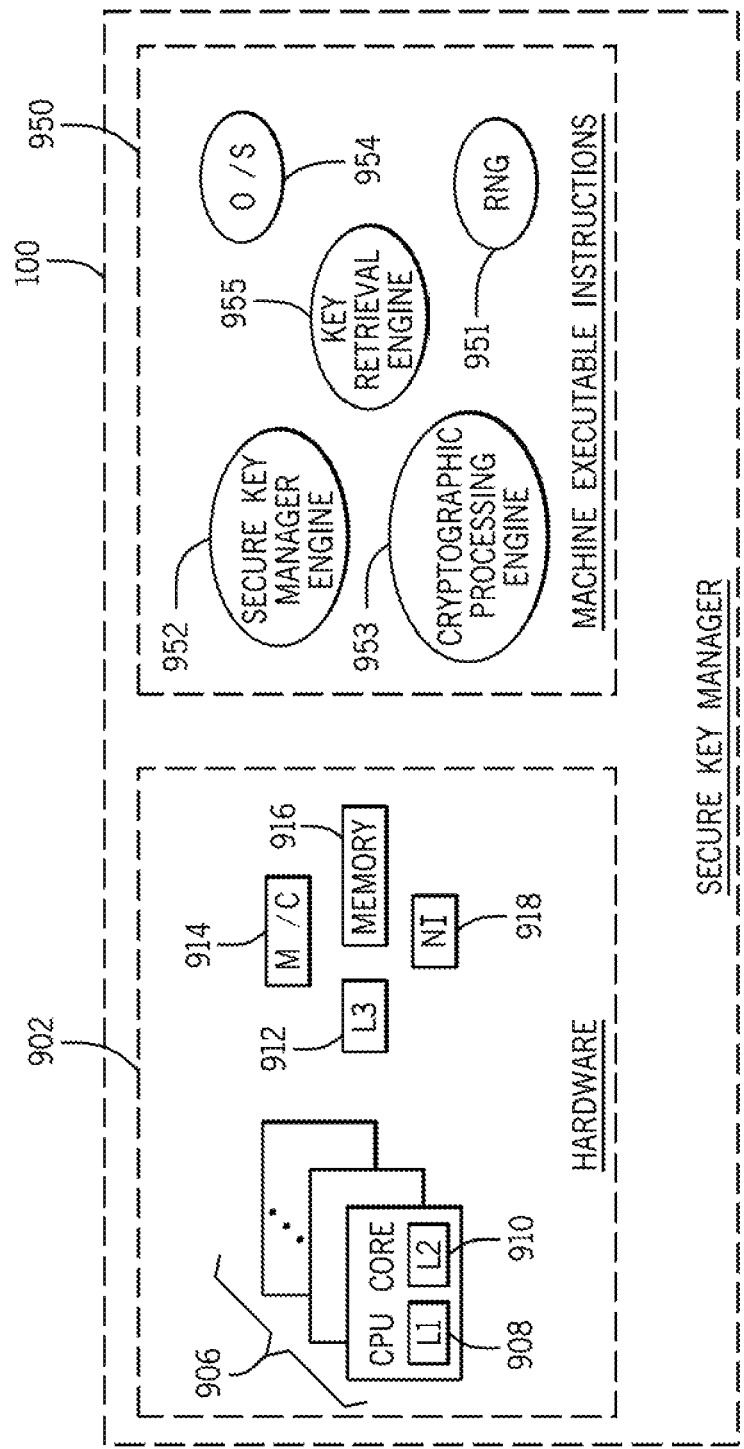
FIG. 9 is a schematic diagram illustrating an architecture of the secure key manager according to an example implementation.

In accordance with example implementations, the secure key manager 100 may have an architecture that is schematically represented in FIG. 9. In general, the secure key manager 100 may include hardware 902 and machine executable instructions, or "software," 950. In general, the hardware 902 may include one or multiple central processing unit (CPU) cores 906. As an example, the security processor 204 (FIG. 2) may include one or multiple CPU cores 906, in accordance with example implementations. Moreover, in accordance with example implementations, each CPU core 906 may include onboard memory, such as level one (L1) cache 808 and a level two (L2) cache 910.

The hardware 902 may also include memory that is accessed by the CPU core(s) 906, such as a level three (L3) cache 912 and a system memory 916. In accordance with example implementations, any, part or a combination of the L1 cache 808, L2 cache 910, L3 cache 912, or system memory 916 may serve as the memory 214 (FIG. 2) that stores copy(ies) of constructed security key(s). The hardware 902 may include other and/or different components than the components that are depicted in FIG. 9, in accordance with further example implementations, such as a memory controller 914, a network interface 918, and so forth.

The software 950 may include a set of machine executable instructions that, when executed by one or multiple CPU core(s) 906, cause the CPU core(s) 906 to form a secure key manager engine 952 to manage, serve and protect security keys. Moreover, the software 950 may include a set of machine executable instructions that, when executed by one or multiple CPU core(s) 906, cause the CPU core(s) 906 to form a cryptographic processing engine 953 for purposes of processing one or multiple cryptographic ciphers.

As also depicted in FIG. 9, the software 950 may include a set of machine executable instructions that, when executed by one or multiple CPU core(s) 906, cause the CPU core(s) 906 to form a key retrieval engine 955 for purposes of retrieving key components/subcomponents in a manner that inhibits electromagnetic field-based eavesdropping, as described herein. Additionally, in accordance with example implementations, the key retrieval engine 955 may use the output of a random number generator 951, which may be another software component and may be used by the engine 955, as described herein. The software 950 may include different and/or other machine executable instructions that when executed may form various other software components, such as an operating system 954, device drivers, applications and so forth.

Other implementations are contemplated, which are within the scope of the appended claims. As examples, in accordance with further implementations, a processor may retrieve components of a key as described herein for a platform of an electronic system other than a secure key manager and/or may retrieve components of security key in a system other than a data center system. In accordance with example implementations, one, multiple or all of the random number generator 951, secure key manager engine 952, cryptographic processing engine 953 and key retrieval engine 955 may be constructed as hardware component(s) formed from dedicated hardware (one or more integrated circuits that contain logic configured to perform key retrieval, security monitoring, encryption, random number generation, and so forth). Thus, the random number generator 951 and/or engines 952, 953 and 955 may take on one of many different forms and may be based on software and/or hardware, depending on the particular implementation.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
for an existing security key corresponding to components associated with a plurality of locations of an electronic device, performing a plurality of instances of reconstructing the security key, wherein performing the plurality of instances of reconstructing the security key comprises, for each instance of the plurality of instances, retrieving the components of the security key from the plurality of locations of the electronic device and reconstructing the security key in each of the instances of the plurality of instances from the retrieved components; and
inhibiting electromagnetic field-based eavesdropping from being used to reveal the security key, wherein the inhibiting comprises:
varying a protocol used to retrieve the components among the instances.

2. The method of claim 1, wherein varying the protocol comprises varying a timing associated with retrieving the components.

3. The method of claim 1, wherein varying the protocol comprise varying an order associated with retrieving the components.

4. The method of claim 1, wherein:
at least one of the components comprises subcomponents; and
varying the protocol comprises varying at least one of an order and a timing associated with retrieving the subcomponents.

5. The method of claim 1, further comprising:
initiating at least one of the instances in response to an external request received by the electronic device.

6. An apparatus comprising:
a platform comprising memories and a processor; and
an enclosure to prevent unauthorized access to the platform;
wherein:
the memories have different associated physical locations in the platform, each location storing a component of an existing security key; and
the processor retrieves the components of the security key from the locations according to a retrieval sequence to reconstruct the security key for a given reconstruction instance, wherein the retrieval sequence is irregular with respect to at least one other-retrieval sequence used previously by the processor to retrieve the components to reconstruct the security key for another reconstruction instance, and the irregularity of the retrieval sequences inhibit electromagnetic field-based eavesdropping outside the enclosure from being used to reveal the security key.

7. The apparatus of claim 6, further comprising:
a security monitor to monitor the physical locations to detect a penetration attack.

8. The apparatus of claim 6, wherein the retrieval sequence that is irregular varies in at least one of time and order relative to the at least one other retrieval sequence.

9. The apparatus of claim 6, wherein the processor selects the retrieval sequences from a set of predefined retrieval sequences.

10. The apparatus of claim 6, wherein the components comprises a first component having associated first subparts and at least one other component having associated subparts, and the processor, according to the retrieval sequence that is irregular:
retrieves a first set of at least one of the first subparts of the first component;
after retrieving the first set, retrieves at least one subpart of the at least one other component; and
after retrieving the at least one subpart of the at least one other component, retrieves at least one other subpart of the first component.

11. A non-transitory computer readable storage medium storing instructions that when executed by a computer cause the computer to:
reconstruct an existing key corresponding to components stored in different memory locations of the computer, wherein reconstructing the key comprises retrieving the components of the key from the different memory locations of the computer according to a first retrieval sequence and reconstructing the key from the components retrieved according to the first retrieval sequence; and
reconstruct the key again, wherein reconstructing the key again comprises retrieving the components of the key from the locations according to a second retrieval sequence and reconstructing the key from the components retrieved according to the second retrieval sequence, and the second retrieval sequence being different from the first retrieval sequence to inhibit electromagnetic field-based eavesdropping from being used to reveal the key.

12. The storage medium of claim 11, wherein the second sequence varies in at least one of time and order relative to the first sequence.

13. The storage medium of claim 11, the storage medium storing instructions that when executed by the computer cause the computer to:
   receive a random value; and
   use the random value to identify at least one of the first and second retrieval sequences.

14. The storage medium of claim 11, the storage medium storing instructions that when executed by the computer cause the computer to select at least one of the first and second retrieval sequences from a set of predefined retrieval sequences.

15. The storage medium of claim 11, wherein the components comprise a first component having associated first subparts and at least one other component having associated subparts, the storage medium storing instructions that when executed by the computer cause the computer to, according to a least one of the first and second retrieval sequences:
   retrieve a first set of at least one of the first subparts of the first component;
   after retrieving the first set, retrieve at least one subpart of the at least one other component; and
   after retrieving the at least one subpart of the at least one other component, retrieve at least one other subpart of the first component.

* * * * *